Patented Feb. 15, 1938

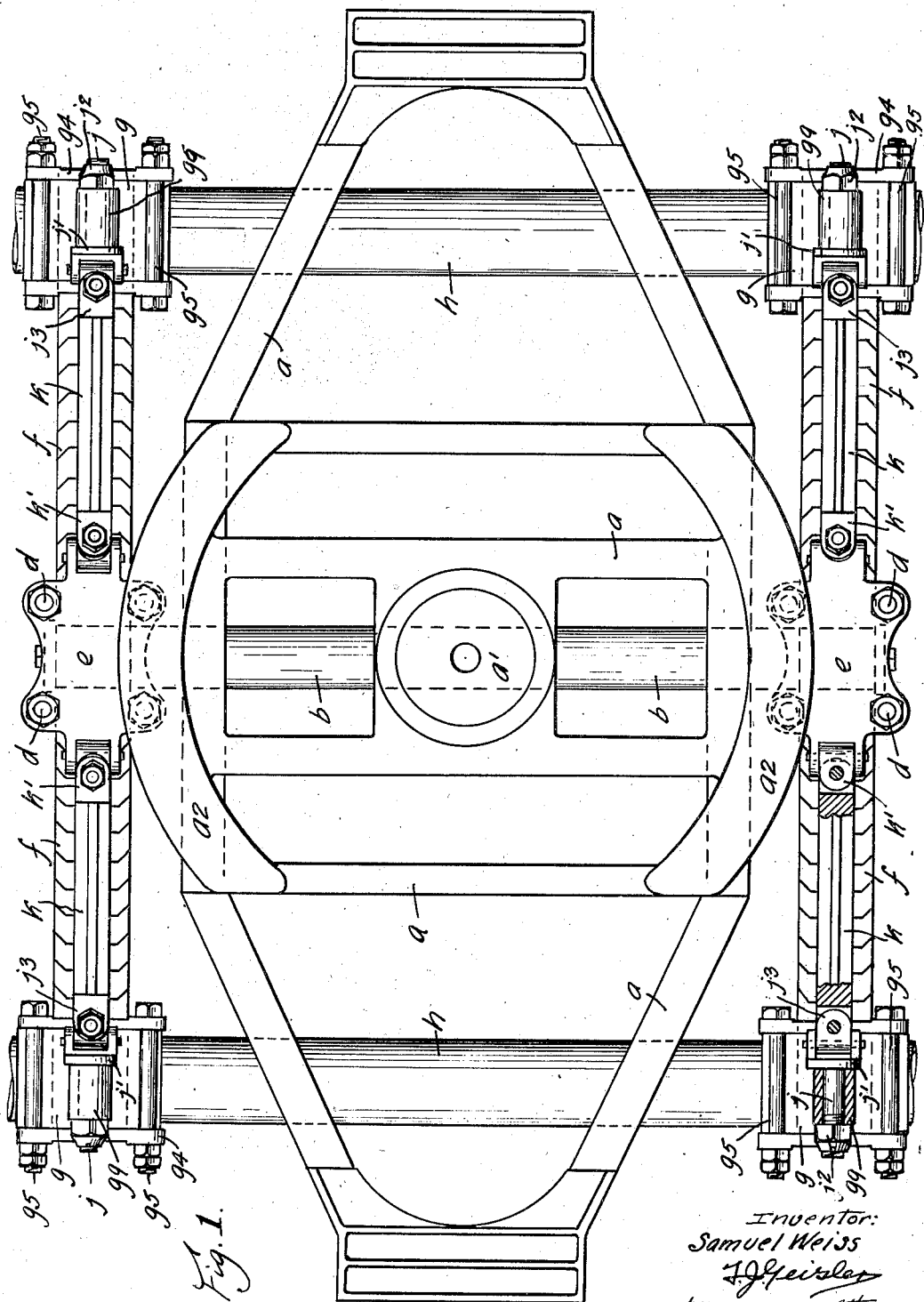

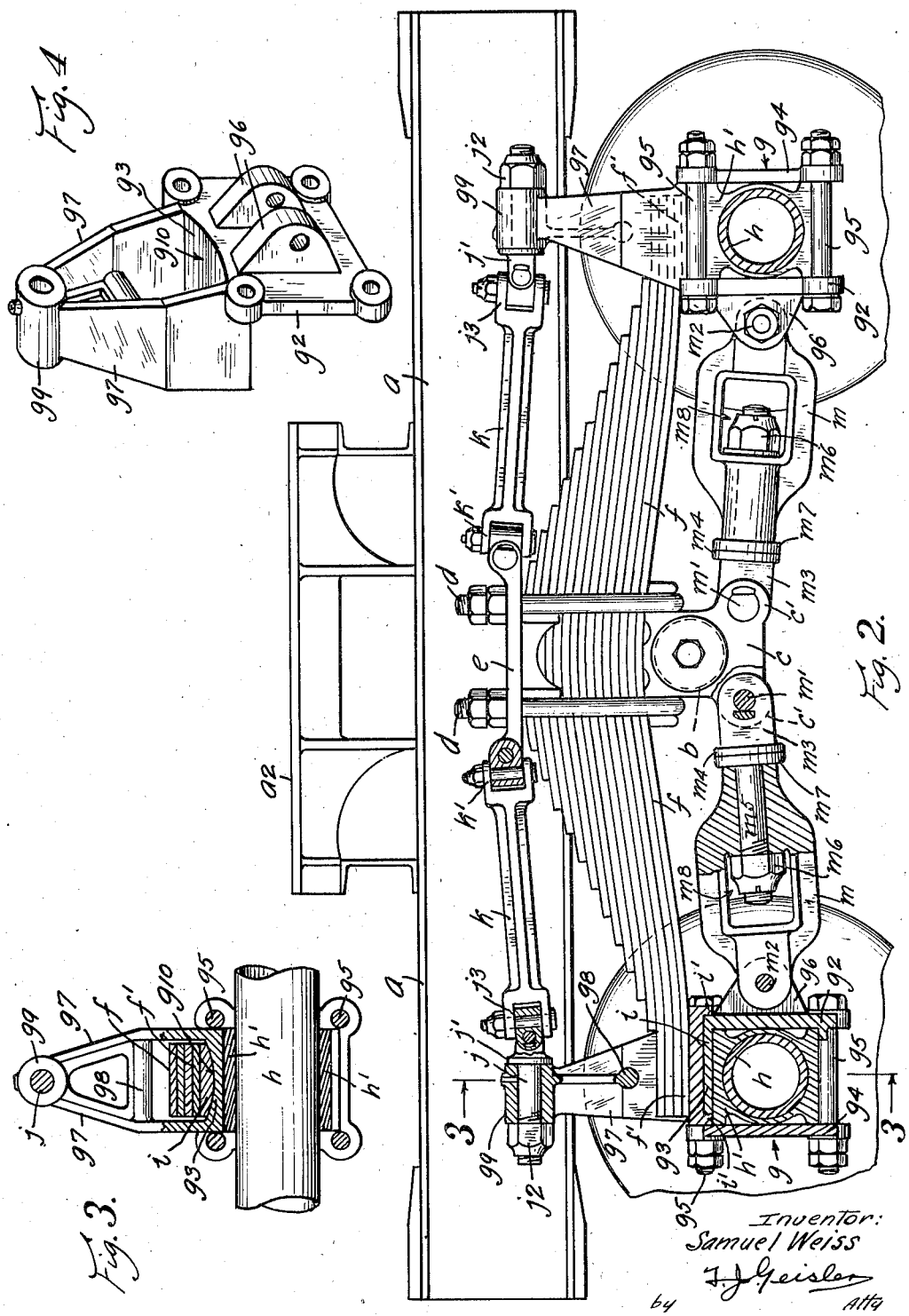

2,108,323

UNITED STATES PATENT OFFICE 2,108,323

LOGGING TRAILER

Samuel Weiss, Portland, Oreg., assignor to Vaughan Motor Company, Inc., Portland, Oreg., a corporation of Oregon Application January 27, 1936, Serial No. 60,968

6 Claims. (Cl. 280—124)

My invention relates to four-wheel trailers used chiefly in the hauling of long, heavy logs, and designed for supporting the ends of such logs.

These trailers are made with front and rear axles, with wheels rotatably mounted on the ends of each axle, and with a short wheel base, that is a short distance between the wheels on either side. Because of the short wheel base, it is not necessary to provide means for steering the wheels. It is advisable, however, due to the heavy loads which are carried, to provide suitable brakes for the wheels.

One of the objectionable features common to trailers of this kind is that adequate means have not been provided heretofore permitting each of the four-wheels to be raised and lowered independently in conformity with inequalities in the road surfaces. The unevenness in the road surface over which these logging trailers are run, and the passing of any one or the other of the wheels over large bumps or rocks when the trailers are heavily loaded, impose very severe strains and twists on the trailer frames and axles, and, in view of this fact, such trailers, when used for heavy hauling are comparatively short lived, require frequent repairs and replacements, and a high cost for upkeep.

The object of my invention is to provide a construction in which such undue strain and twist on either the trailer body frame, the wheel axles, or the other parts of the running gear of the trailer will be eliminated.

A further object of my invention is to provide a spring mounting at the end of each axle adapted to accommodate the independent lifting of any wheel of the trailer a substantial distance from the ground, without imposing any twisting or straining on the axles, the trailer body, or their associated parts.

Another object of my invention is to provide means which will freely permit the independent tilting of either axle from the horizontal, without causing any strain or twist on such axle or associated parts.

When such trailers are heavily loaded and the brakes are suddenly applied to the wheels, a very considerable torque is exerted on the axles and on the connecting parts. A similar strain takes place when the wheels are forced over bumps and similar minor obstructions.

Another object of my invention is to prevent the imposing of such torque upon the axles, or such severe strain on other parts, under these conditions.

A further object of my invention is to construct a trailer adapted to meet all the above specified requirements without any sacrifice in sturdiness of construction, and with the employment of relatively simple devices which will not result in any undue increase in cost of manufacture of said trailers.

I attain the above mentioned and incidental objects by constructing my trailer with the body frame mounted on a transverse shaft in the usual manner, but by supporting the transverse shaft at its ends on the axles by flexible supports connected to the ends of the axles, by having such supporting means include leaf-springs whose ends rest on the axle ends, and by providing upper and lower parallel link-assemblies adapted to restrain the axle ends against yielding to torque imposed thereon while permitting freedom of movement up and down of the axle ends and tilting of the axles. The construction of my said flexible supporting means and the manner in which said means accomplish the desired objects are hereinafter described with reference to the accompanying drawings, in which:

Fig. 1 is a plan or top view of my trailer with wheels, draw bar and "bunk" omitted;

Fig. 2 is a side elevation, corresponding to Fig. 1, with the axle boxes and certain parts associated therewith shown in section;

Fig. 3 is a transverse section on the line 3—3 of Fig. 2; and

Fig. 4 is a view in perspective of the main member of the axle box.

My trailer comprises a body frame $a$ which is pivotally mounted on a transverse shaft $b$, as common in trailers of this kind. The mounting of the body frame $a$ on the shaft $b$ permits tilting of the body at either end, as takes place when hauling over grades. The trailer is understood to include the usual "bunk" (not shown), on which the logs rest. The "bunk" will be pivotally mounted on the body frame $a$ at a center point $a'$ (Fig. 1) for movement in a horizontal plane, with the sides of the "bunk" supported by arcuate plates $a2$ provided at the sides of the body frame, as also common to trailers of this class.

The ends of the transverse shaft $b$ are supported by side plates or lower spring clamping plates $c$, to each of which a leaf-spring $f$, and horizontal clamping plate $e$ are firmly connected by a pair of U-bolts $d$.

The axles $h$, which may be tubular, are preferably made with squared enlargements $h'$ welded thereon near each end. Clip-like axle boxes $g$ are rigidly clamped about each of the four squared enlargements $h'$. Each of the axle boxes comprises a part shaped as shown in Fig. 4, consisting of a side $g2$, a top $g3$ having integral upper extensions $g7$. To the part shown in Fig. 4 a separate plate $g4$ is secured (see Fig. 2) by tie-bolts $g5$, thus firmly securing the axle box on the axle $h$. The side portion $g2$ is made with a pair of ears $g6$. The integral upper extensions $g7$ are joined by a cross web $g8$, and converge at the top, terminating in a knuckle $g9$.

The upper face of the top portion $g3$ is preferably transversely concaved between the bases of the upper extensions $g7$, as shown at $g10$ in Figs. 3 and 4. A bearing plate $i$, having its lower face convexed to conform with the concaved surface $g10$, and its upper face plane, is seated on the top portion $g3$, as shown in Figs. 2 and 3; and the plate $i$ constitutes a bearing surface on which an end $f'$ of the leaf springs $f$ slidably rests. The bearing plate $i$ is made with downwardly extending flanges $i'$ at each end (see Fig. 2) to prevent its displacement from between the bases of the upper extensions $g7$.

The knuckles $g9$ of the extensions $g7$ provide journal bearings for stub shafts $j$, which are rotatably held in place in the knuckles $g9$ by annular flanges $j'$ and nuts $j2$, respectively. Each stub shaft $j$ is connected by means of a universal joint $j3$ to a link $k$, which link in turn is connected by a universal joint $k'$ to the leaf spring clamping plate $e$.

The side plates $c$ are made with a pair of ears $c'$, one at each side. Links $m3$ are pivotally connected to the ears $c'$ by pins $m'$. Each of said links $m3$ is made with an integral annular flange $m4$ and bolt $m5$. Compensating links $m$ are rotatably mounted on said bolts $m5$ and held in place by nuts $m6$ located in the openings $m8$. Said compensating links $m$ are provided with annular flanges $m7$ at one end, serving as bearing plates against the flanges $m4$, and are pivotally connected at the other end by pins $m2$ to the ears $g6$ of the axle boxes. Thus the axle boxes are tied by articulated members comprising lower and upper longitudinal link assemblies to the side plates $c$, and spring clamping plates $e$; and the leaf-springs $f$, which are firmly held by said side plates and said clamping plates, and which have their ends slidably resting on the axle-boxes, support said plates and therewith the transverse shaft $b$ and the truck body. It is necessary with this construction, however, that the connecting parts be so arranged that the upper and lower link assemblies will be parallel, and this necessitates that the upper extensions $g7$ shall extend a suitable distance above the axles.

From Fig. 2 it will be apparent that each axle box $g$ is permitted independent movement up or down and during such movement will always be held in vertical position, thus parallel to the U-bolts $d$. Consequently, each axle box $g$ is held against torque when brakes are applied to the wheels; in other words the imposing of any torque on the axles $h$ is prevented. This is a very important feature of my invention. The height of the upper extensions $g7$ is a factor of the holding of the axle boxes against the resulting torque. It is also apparent that the end of each axle, and therewith the corresponding axle box $g$ may freely be raised when a corresponding wheel of the trailer is climbing over a bump or other irregularity in the road bed, without causing the lifting of any of the other three wheels from the ground, and without imposing any undue strain on the trailer frame, axles, or connecting parts.

Furthermore, altho when one of the wheels is thus lifted the axle on which such wheel is mounted is tilted transversely from the horizontal, thereby causing the axle boxes $g$ at each end of the axle to be relatively tilted, the swivel action provided by the lower link connections $m$ and the universal joints and swivel action provided by the upper link connections attached to the upper extensions $g7$ of the axle boxes permit such tilting of the axle boxes freely without imposing any undue strain on the members of the articulated supporting assembly, or on the axle, or the body frame of the trailer. This is another very important feature of my invention.

Furthermore, when said tilting of one of the axles $h$ occurs, there is no twisting of the leaf-spring $f$, since the lower faces of the ends $f'$ of the spring ride freely on the plates $i$, which plates are free to rotate transversely on their curved lower surface while permitting their upper plane surfaces to remain in the normal plane of the lower faces of the springs $f$, thus providing firm but flexible bearings for the ends $f'$ of the leaf springs $f$ under all conditions.

I have described only one practical embodiment of my invention, but obviously various mechanical modifications might be made in the arrangement of its component parts without altering the principle of operation of my invention and my invention is therefore not to be considered as limited to the particular embodiment or to the particular form or shape of the connecting parts which I have shown.

I claim:

1. In a logging trailer of the type described including a transverse shaft, a load supporting frame pivotally mounted on said shaft and a pair of wheel axles, the combination of axle-boxes attached to said axles, said axle-boxes provided with upper extensions, leaf springs, upper and lower clamping plates securing said leaf springs between them, said transverse shaft pivotally supported by a pair of said clamping plates, the ends of said leaf springs slidably resting on said axle-boxes, means for limiting the lateral movement of each of said spring ends in either direction on said axle-boxes, lower and upper parallel link assemblies connecting said axle-boxes with said lower plates, and connecting the ends of said upper extensions with said upper plates, respectively, and universal joints in said link assemblies.

2. In a logging trailer of the type described including a transverse shaft, a load supporting frame pivotally mounted on said shaft and a pair of wheel axles, the combination of axle-boxes attached to said axles, said axle-boxes provided with upper extensions, leaf springs, upper and lower clamping plates securing said leaf springs between them, said transverse shaft pivotally supported by a pair of said clamping plates, bearing plates supported on said axle-boxes, the ends of said leaf springs resting on said bearing plates, the lower faces of said bearing plates being curved, and the surface portion of said axle-boxes supporting said bearing plates being curved correspondingly, whereby to permit lateral rocking of said bearing plates and therewith said leaf springs on said axle-boxes, means for limiting the lateral movement of each of said spring ends and said bearing plates in either direction on said axle-boxes, means for limiting the longitudinal movement of said bearing plates, lower and upper parallel link assemblies connecting said axle-boxes with said lower plates, and connecting the ends of said upper extensions with said upper plates, respectively, and universal joints in said link assemblies.

3. In a logging trailer of the type described including a transverse shaft, a load supporting frame pivotally mounted on said shaft and a pair of wheel axles, the combination of axle-boxes attached to said axles, said axle-boxes provided with upper extensions terminating in knuckles, leaf springs, upper and lower clamping plates securing said leaf springs between them, said transverse shaft pivotally supported by a pair of said clamping plates, the ends of said leaf springs slidably resting on said axle-boxes, means for limiting the lateral movement of each of said spring ends in either direction on said axle-boxes, lower and upper parallel link assemblies connecting said axle-boxes with said lower plates, and connecting the ends of said upper extensions with said upper plates, respectively, said upper link assemblies including bolts rotatable in said knuckles, links and universal couplings, and said lower link assemblies including pivoted swivel couplings and links.

4. In a logging trailer of the type described including a transverse shaft, a load supporting frame pivotally mounted on said shaft and a pair of wheel axles, the combination of axle-boxes attached to said axles, leaf springs, upper and lower clamping plates securing said leaf springs between them, said transverse shaft pivotally supported by a pair of said clamping plates, the ends of said leaf springs slidably resting on said axle-boxes, means for limiting the lateral movement of each of said spring ends in either direction on said axle-boxes, lower and upper parallel link assemblies connecting said axle-boxes with said lower and upper clamping plates, respectively, and each of said link assemblies including swivel elements.

5. In a logging trailer of the type described including a transverse shaft, a load supporting frame pivotally mounted on said shaft and a pair of wheel axles, the combination of axle-boxes attached to said axles, said axle-boxes provided with upper extensions terminating in knuckles, leaf springs, upper and lower clamping plates securing said leaf springs between them, said transverse shaft pivotally supported by a pair of said clamping plates, bearing plates supported on said axle-boxes, the ends of said leaf springs resting on said bearing plates, the lower faces of said bearing plates being curved, and the surface portion of said axle-boxes supporting said bearing plates being curved correspondingly, whereby to permit lateral rocking of said bearing plates and therewith said leaf springs on said axle-boxes, means for limiting the lateral movement of each of said spring ends and said bearing plates in either direction on said axle-boxes, means for limiting the longitudinal movement of said bearing plates, lower and upper parallel link assemblies connecting said axle-boxes with said lower plates, and connecting the ends of said upper extensions with said upper plates, respectively, said upper link assemblies including bolts rotatable in said knuckles, links and universal couplings, and said lower link assemblies including universal joints.

6. In a logging trailer of the type described including a transverse shaft, a load supporting frame pivotally mounted on said shaft and a pair of wheel axles, the combination of axle-boxes attached to said axles, leaf springs, upper and lower clamping plates securing said leaf springs between them, said transverse shaft pivotally supported by a pair of said clamping plates, bearing plates supported on said axle-boxes, the ends of said leaf springs resting on said bearing plates, the lower faces of said bearing plates being curved, and the surface portion of said axle-boxes supporting said bearing plates being curved correspondingly, whereby to permit lateral rocking of said bearing plates and therewith said leaf springs on said axle-boxes, means for limiting the lateral movement of each of said spring ends and said bearing plates in either direction on said axle-boxes, means for limiting the longitudinal movement of said bearing plates, lower and upper parallel link assemblies connecting said axle-boxes with said lower and upper clamping plates, respectively, and each of said link assemblies including swivel elements.

SAMUEL WEISS.